United States Patent
Buterbaugh et al.

(10) Patent No.: US 7,519,843 B1
(45) Date of Patent: Apr. 14, 2009

(54) METHOD AND SYSTEM FOR DYNAMIC PROCESSOR SPEED CONTROL TO ALWAYS MAXIMIZE PROCESSOR PERFORMANCE BASED ON PROCESSING LOAD AND AVAILABLE POWER

(75) Inventors: Jerrod Kimmel Buterbaugh, Wake Forest, NC (US); Raymond Mathew Clemo, Raleigh, NC (US); Brian Christopher Totten, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/130,986

(22) Filed: May 30, 2008

(51) Int. Cl.
*G06F 1/08* (2006.01)
(52) U.S. Cl. ..................... 713/322; 713/340
(58) Field of Classification Search .............. 713/322, 713/340
See application file for complete search history.

(56) References Cited

U.S. PATENT DOCUMENTS

| | | | |
|---|---|---|---|
| 6,466,126 B2 | 10/2002 | Collins et al. | |
| 7,069,463 B2 | 6/2006 | Oh | |
| 7,181,633 B2 | 2/2007 | Flynn | |
| 7,240,225 B2 | 7/2007 | Brewer et al. | |
| 2003/0074591 A1 | 4/2003 | McClendon et al. | |
| 2004/0030939 A1* | 2/2004 | Barr et al. | 713/300 |
| 2005/0172158 A1 | 8/2005 | McClendon et al. | |
| 2005/0289362 A1* | 12/2005 | Merkin et al. | 713/300 |
| 2006/0069928 A1* | 3/2006 | Winick et al. | 713/300 |
| 2006/0161794 A1 | 7/2006 | Chiasson et al. | |
| 2006/0168461 A1 | 7/2006 | Allen | |
| 2007/0103222 A1 | 5/2007 | Kim et al. | |
| 2007/0234090 A1 | 10/2007 | Merkin et al. | |
| 2008/0077817 A1* | 3/2008 | Brundridge et al. | 713/340 |

\* cited by examiner

*Primary Examiner*—Tuan N Du
(74) *Attorney, Agent, or Firm*—Kenneth L. Sherman, Esq.; Michael Zarrabian, Esq.; Myers Dawes Andras & Sherman, LLP

(57) ABSTRACT

A method and system for controlling clocking speed of a processor, is provided. One implementation involves receiving a real-time precision signal representing available power from a power supply output, monitoring said real-time precision signal, and dynamically adjusting the clocking speed of the processor based on the monitored signal for dynamic processor speed throttling based on available power, whereby the processor is clocked at the maximum speed that matches the maximum output power available from the power supply, wherein the processor clock frequency is adjusted up or down continuously to always maximize processor performance based on available power at the system level.

1 Claim, 2 Drawing Sheets

METHOD AND SYSTEM FOR DYNAMIC PROCESSOR SPEED CONTROL TO ALWAYS MAXIMIZE PROCESSOR PERFORMANCE BASED ON PROCESSING LOAD AND AVAILABLE POWER

BACKGROUND OF THE INVENTION

1. Field of the Invention

The present invention relates generally to processor control, and in particular, to processor clocking speed control.

2. Description of the Related Art

The ability to control (throttle) a processor operation speed is based on controlling clocking frequency of the processor. Conventionally, a processor can be throttled to any one of a few predefined power states or thresholds, based on system or user input. System throttle thresholds are based on power system fault scenarios and power data provided in product data tables. However, such predefined throttle thresholds do not maximize the processor (CPU) clock/performance.

BRIEF SUMMARY OF THE INVENTION

The invention provides a method and system for controlling clocking speed of a processor. One embodiment involves receiving a real-time precision signal representing available power from a power supply output, monitoring said real-time precision signal, and dynamically adjusting the clocking speed of the processor based on the monitored signal for dynamic processor speed throttling based on available power, whereby the processor is clocked at the maximum speed that matches the maximum output power available from the power supply, wherein the processor clock frequency is adjusted up or down continuously to always maximize processor performance based on available power at the system level.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

Figure 1:
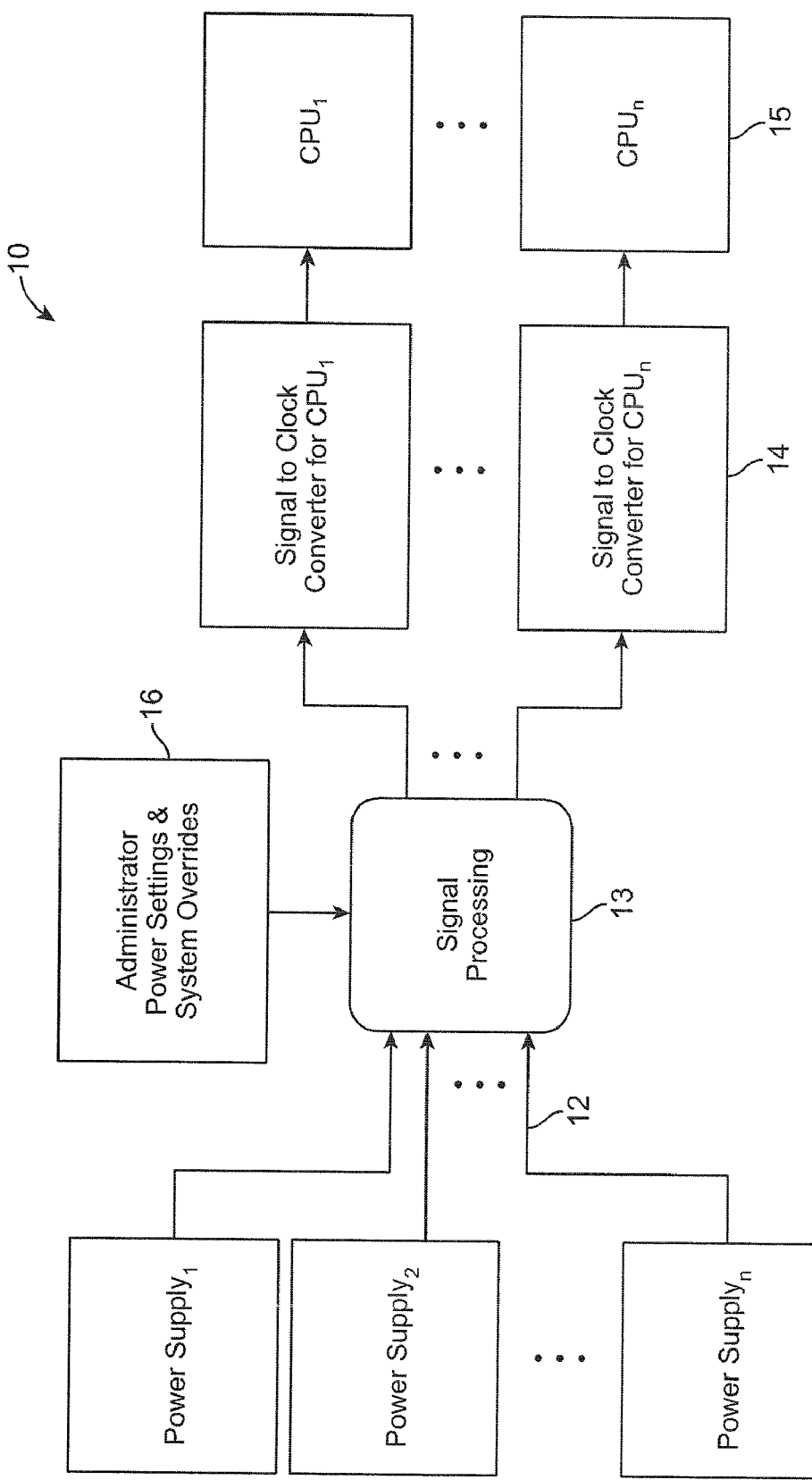
FIG. 1 shows a functional block diagram of a system for controlling processor speed, according to an embodiment of the invention.

Other aspects and advantages of the present invention will become apparent from the following detailed description, which, when taken in conjunction with the drawings, illustrate by way of example the principles of the invention.

DETAILED DESCRIPTION OF THE INVENTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for controlling clocking speed of a processor. One implementation involves maximizing the processor (CPU) clock/performance based on the maximum real-time power available from power supplies. The power consumption of the CPU is continuously adjusted based on real-time representation of available power. In this way, the CPU can maximize performance over time. The CPU clocking speed is dynamically adjusted based on an analog or digital signal which represents the available power from one or more power supplies. This allows the CPU to be clocked at maximum based on available electrical power of said one or more power supplies. This eliminates the conventional need for setting arbitrary throttle boundaries based on a redundant power supply failure or software tables that have hard coded power numbers for system components.

The invention essentially maximizes the system and CPU performance for any system configuration, and automatically adjusts the CPU clock (if required) for fault conditions. For example, considering a case where a system including multiple CPUs and plural power supplies, is running at maximum (e.g., 100%) performance in an oversubscribed power mode. Conventionally, if one power supply fails, the clocking speeds of the CPUs are throttled back to a predefined value/frequency that is based on power estimates and measurement data stored in VPD tables. However, in such a scenario the invention maximizes the system/CPU performance per watt of available electrical power from the remaining power supplies. Further, in case of a lightly loaded system there may be no need to throttle down the CPUs in case one of the power supplies fails, because the remaining power supply can still support the entire load with the CPUs at maximum utilization (clocking). In such a scenario the invention maintains the clocking speed for the CPUs to maximize performance.

Each power supply delivers a scaled analog or digital signal which represents the real-time available DC power. The signal is an input to the CPU clock control circuits. The clock control circuits monitor this signal and through the appropriate analog and digital circuits adjust the clock frequency of the CPU. Specifically, the clock control circuits monitor the output signals from the power supplies signal to dynamically adjust the clock speed of the CPUs. As such, the CPUs can always be clocked at maximum speed that matches the maximum DC output power available from the power supply/supplies. There is no need for predefined throttle levels for the CPU in this configuration because the system maximizes CPU performance for any power supply (or combination of power supplies) that is installed.

FIG. 1 shows a functional block diagram of a system 10 implementing an embodiment of controlling clocking speed of one or more processors, according to the invention. Outputs from one or more power supplies 11 (e.g., Power Supply$_1$, ..., Power Supply$_n$) include real-time precision analog or digital signals 12 which represents available power from each power supply. The output signals from the power supplies can be either precision analog or digital signals that have a predefined maximum value such as F=no power available, or 1.5V=no power available. Internal circuits in the power supplies monitor output voltage and current and convert the real-time voltage and current to power.

A signal processing module 13 monitors the signals that represent the available DC power from the power supplies. The signal processing module 13, through a decision making process (FIG. 2), outputs an analog or digital signal to each of multiple signal to clock converters 14, to throttle a corresponding CPU 15 (e.g., CPU$_1$, ..., CPU$_n$), accordingly. Each signal to clock converter 14 speeds up or slows down the CPU clock based on the input signal from the signal processing module 13. Each signal to clock converter 14 may comprise a voltage regulator that lowers its output voltage, throttling the corresponding CPU in voltage controlled clocking architectures. An administration module 16 allows user/administrator to set limits if power capping is desired.

Figure 2:
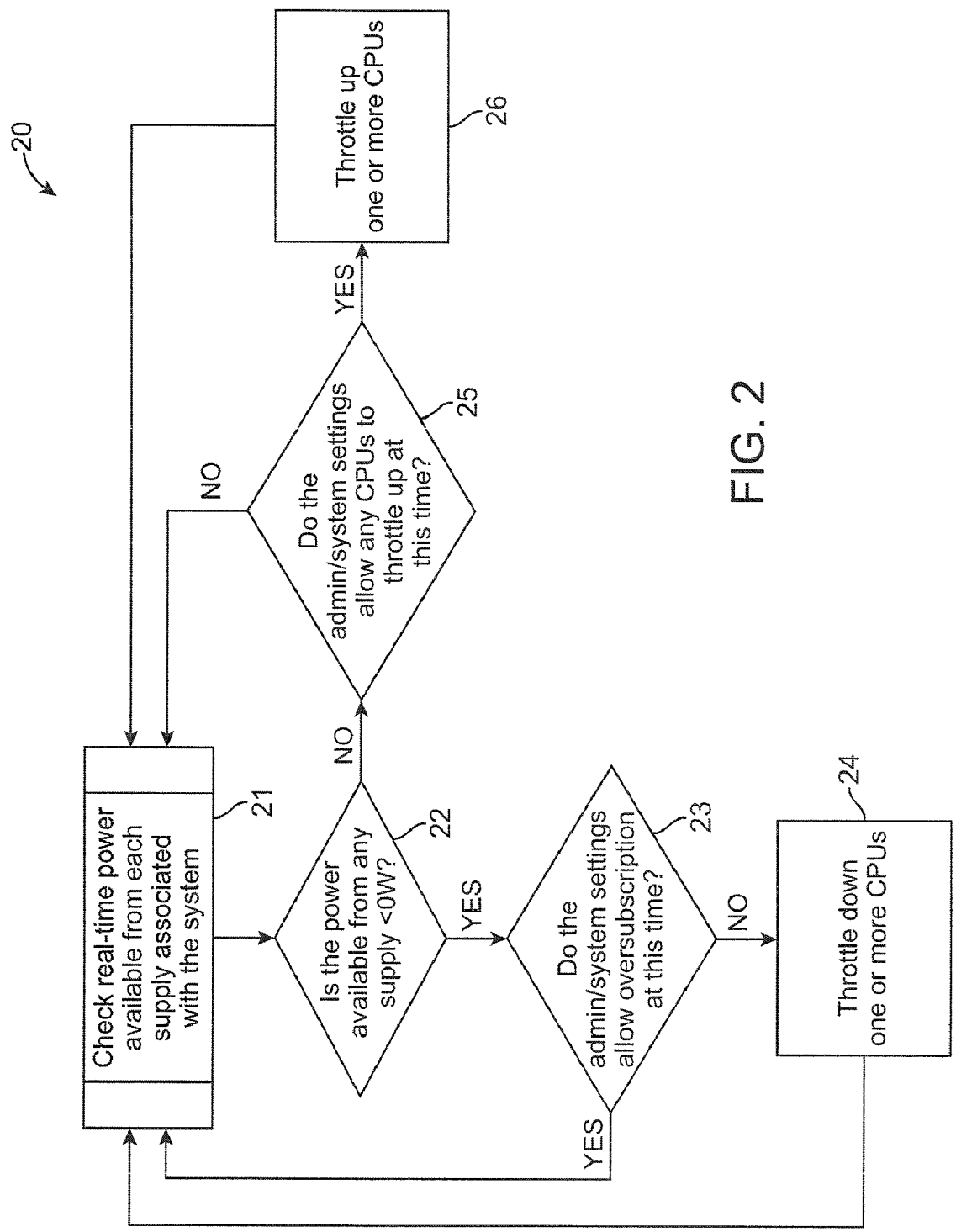
FIG. 2 shows a block diagram of a process for controlling processor speed, according to an embodiment of the invention.

FIG. 2 shows a block diagram of a process 20 for controlling clocking speed of one or more processors, according to an embodiment of the invention. The process 20 includes the following processing blocks:

- Block 21: Check real-time power available from each supply associated with the system.
- Block 22: Is the power available from any power supply less than 0 watts (<0W)? If yes, proceed to block 23, else proceed to block 25.
- Block 23: Do the administrator/system settings allow oversubscription at this time? If yes, proceed to block 21, else proceed to block 24.
- Block 24: Throttle down one or more CPUs. Proceed to block 21.
- Block 25: Do the administrator/system settings allow any CPUs to throttle up at this time? If yes, proceed to block 26, else proceed to block 21.
- Block 26: Throttle up one or more CPUs. Proceed to block 21.

In another example, where there is a need to install lower power rated power supplies, the real-time power available from the supplies is used to determine the maximum clock speed of the CPUs, allowing for automatic control of oversubscription and throttling based on system load dynamics.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of controlling clocking speed of a processor, comprising:

receiving a real-time precision signal representing available power from a power supply output;

monitoring said real-time precision signal; and dynamically adjusting the clocking speed of the processor based on the monitored signal for dynamic processor speed throttling based on processing load and available power;

whereby the processor is clocked at the maximum speed that matches the maximum output power available from the power supply, wherein the processor clock frequency is selectively adjusted continuously as needed to always maximize processor performance based on processing load and available power at the system level.

* * * * *